March 13, 1956     H. L. WURGAFT     2,737,989
CITRUS FRUIT CUTTER, REAMER AND PEEL EJECTOR
Filed April 28, 1952     7 Sheets-Sheet 1

FIG. 1.

HARRY L. WURGAFT
INVENTOR.

BY *Hazard & Miller*
ATTORNEYS

March 13, 1956  H. L. WURGAFT  2,737,989
CITRUS FRUIT CUTTER, REAMER AND PEEL EJECTOR
Filed April 28, 1952  7 Sheets-Sheet 2

HARRY L. WURGAFT
INVENTOR.

BY Hazard & Miller
ATTORNEYS

March 13, 1956 H. L. WURGAFT 2,737,989
CITRUS FRUIT CUTTER, REAMER AND PEEL EJECTOR
Filed April 28, 1952 7 Sheets-Sheet 3

HARRY L. WURGAFT
INVENTOR.

BY *Hazard & Miller*

ATTORNEYS

March 13, 1956     H. L. WURGAFT     2,737,989
CITRUS FRUIT CUTTER, REAMER AND PEEL EJECTOR
Filed April 28, 1952     7 Sheets-Sheet 7

HARRY L. WURGAFT
*INVENTOR.*

BY *Hazard & Miller*

ATTORNEYS

United States Patent Office 2,737,989
Patented Mar. 13, 1956

2,737,989

CITRUS FRUIT CUTTER, REAMER, AND PEEL EJECTOR

Harry L. Wurgaft, Fullerton, Calif.

Application April 28, 1952, Serial No. 284,687

2 Claims. (Cl. 146—3)

This invention relates to improvements in citrus fruit juicing machines.

A primary object of the invention is to provide a relatively compact machine which will effectively handle a large quantity of citrus fruit to receive the fruit divided into halves, ream the halves to obtain the juice, and expel the peels or skins.

Machines of this character are frequently installed in canneries where the juice obtained is immediately canned or quick-frozen. In such establishments there rarely is a competent mechanic capable of repairing machines of this character in the event of breakdowns so that if a machine, due to wear, accident, or otherwise, gets out of running order the entire establishment must be shut down until the machine is repaired. In some instances a competent repairman must travel a considerable distance to the cannery to effect the repairs and the time lost in transportation of the mechanic familiar with the machine to the cannery plus the time lost involved in making the repairs may result in a very great loss to the cannery. It is consequently a further object of the present invention to provide a machine that is so designed that most of the working parts of the machine that are apt to suffer from wear or breakage are located externally of the machine so that they are not only readily accessible but standby assemblies may be maintained along with the machine that can be easily substituted for corresponding assemblies on the machine by ordinary mechanics. In this manner, those parts of the machine which are apt to suffer from wear or breakage can be readily removed from the machine as a complete assembly even by a mechanic who is unfamiliar with the details of construction of the machine and a substitution effected so that operation of the machine may be resumed in a relatively short time. The removed assembly can, if necessary, be returned to the manufacturer of the machine for overhaul and repair and subsequently returned to be used as a standby.

Still another object of the invention is to provide a machine of this character, the parts of which can be easily constructed and which will be relatively durable and which is so designed that parts requiring cleaning are readily accessible or may be easily removed, cleaned, and restored.

With the foregoing and other objects in view, which will be made manifest in the following detailed description and specifically pointed out in the appended claims, reference is had to the accompanying drawings for an illustrative embodiment of the invention, wherein:

Referring to the accompanying drawings wherein similar reference characters designate similar parts throughout, the improved machine consists of a frame 10 preferably formed of angle irons or the equivalent, that produces a generally box-like structure. At the tops of the ends of the frame there are bearing blocks 11 having detachable bearing caps 12 and on which there are rotatably supported parallel shafts 13 and 14 which extend longitudinally of the frame. These shafts carry gears 15 and 16 which are gearedly connected together by means of idler pinions 17 and 18 that are rotatably mounted on the bearing blocks 11 so that the two shafts, 13 and 14, will rotate synchronously with respect to each other but in opposite directions. On the shafts 13 and 14 at suitably spaced intervals there are hexagonal hubs 19 which are fixedly mounted thereon, such as by set screws 20. Each hub on each of the two shafts 13 and 14 has radially arranged cups 21 mounted thereon. There are preferably three equally spaced cups 21 on each hub 19 and for the three cups that are mounted on a hub 19 on the shaft 13 there are a corresponding three cups mounted on hub 19 on the shaft 14 in direct opposition thereto. The cups 21 are equipped with threaded studs 22 that extend into the hubs and are held in adjusted position by means of jamb nuts 23 so that the radial positions of the cups on the two shafts may be carefully adjusted with respect to each other.

On the base of the machine there is mounted an electric motor 24 which drives an endless chain 25 through a gear reduction box 26. The chain 25 is trained over a sprocket 27 on a transversely extending shaft 28 that is rotatably supported or suspended by means of bearings 29 from a table or shelf 30 that is detachably mounted on the end of the frame by means of bolts 31. On the end of the shaft 28 there is a miter gear 32 which meshes with a companion miter gear 33 that is fixed to a longitudinally extending shaft 34 that is rotatably mounted in bearings 35 supported on the outside of the frame as by supporting brackets 36. The shaft 34 through its drive from the motor 24 rotates a disc 37 at a constant rotation. This disc carries an eccentric pin 38 on which there is a pitman rod 39. The pitman 39 is connected to a U-shaped yoke 40 that is rotatably mounted on the end of the shaft 13 so as to straddle a ratchet disc 41 on this shaft. The yoke 40 carries a spring actuated pawl 42 engageable in notches 43 of the ratchet disc. These notches are preferably three in number, one notch corresponding to each cup on each hub on the shaft 13. 44 indicates a spring actuated anti-backup pawl which will prevent reverse rotation of the disc 41 and consequently of the shaft 13.

By the mechanism thus described it will be appreciated that as the disc 37 rotates continuously the yoke 40 will be caused to oscillate about the shaft 13 as a center. During downward strokes of the yoke the pawl 42 will engage a notch 43 and advance the ratchet disc 41 a third of a rotation. Upward movement of the yoke 40 is an idle movement swinging the yoke through approximately a third of a circle to allow the pawl 42 to engage the next succeeding notch 43. In this manner, the shaft 13 will be given a step-by-step rotation and as the shaft 14 is gearedly connected thereto the shaft 14 will likewise be given a step-by-step rotation in synchronism or in timed relation to the shaft 13 but in the opposite direction.

During each period of dwell of the two shafts 13 and 14, one of the cups on each of the hubs 19 thereon, such as the cups indicated at 21a will be in lowermost position. Such positions of these cups may be regarded as being at reaming stations of the machine. In these positions reamers to be subsequently described, are projected upwardly into the fruit halves in these cups and ream the contents from the peels or skins. The cups consecutively pass through loading stations, such as are illustrated by the cups 21b in Fig. 11, the reaming stations illustrated by the cup 21a in this figure, and through peel-ejecting stations, such as are illustrated by the cups 21c on Fig. 10 wherein the peels or skins are ejected from the cups.

Figures 8, 9, 10:
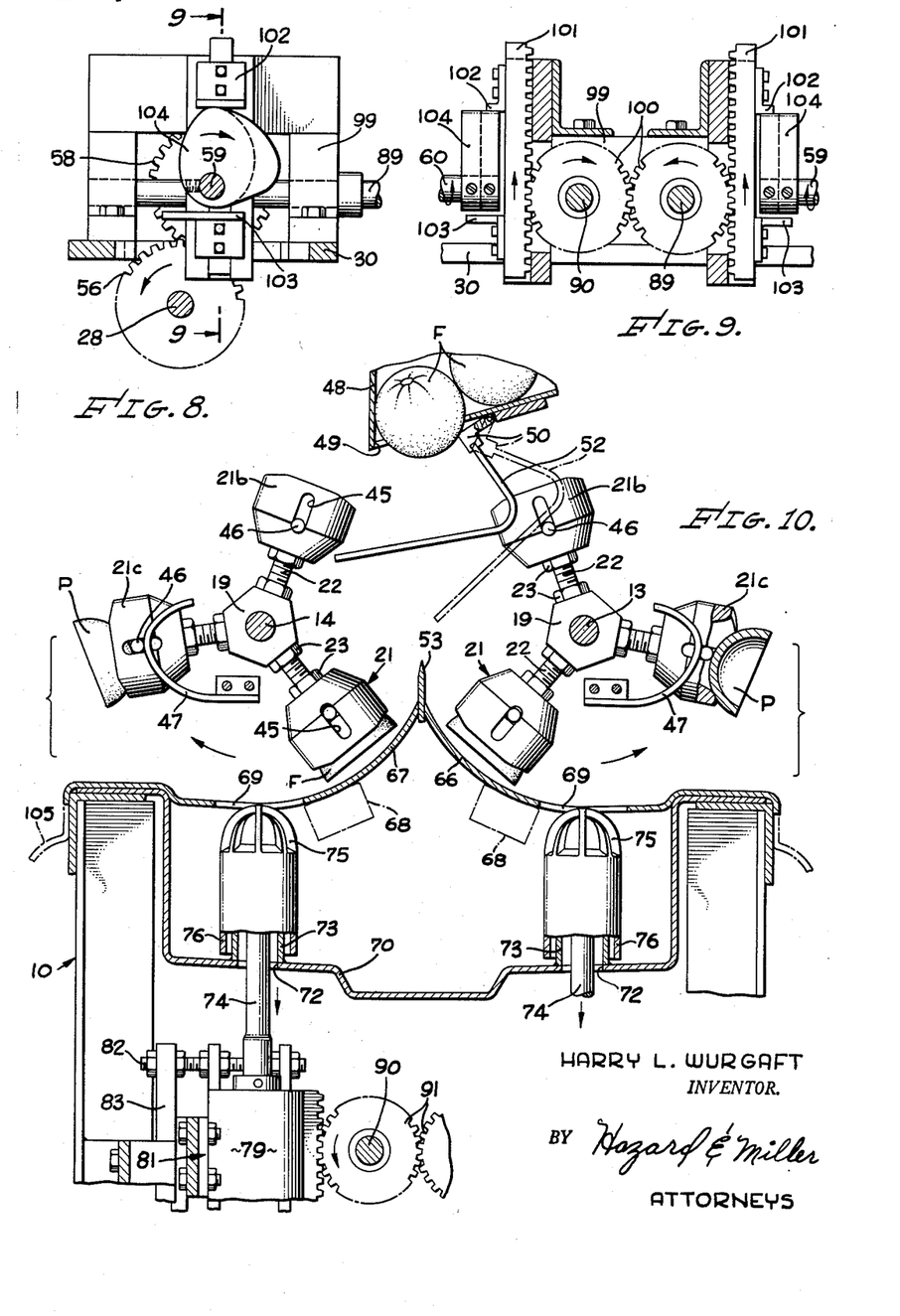
Fig. 8 is an enlarged sectional view taken substantially upon the line 8—8 upon Fig. 2 in the direction indicated.
Fig. 9 is a partial view in vertical section taken substantially upon the line 9—9 upon Fig. 8 in the direction indicated.
Fig. 10 is a view similar to Fig. 5, but illustrating the parts in a subsequent position to that illustrated in Fig. 5.

The sides of the cups 21 are slotted with slots 45 and as the cups 21 on each of the shafts 13 and 14 are arranged in longitudinally extending rows, peel or skin-ejecting rods 46, which are common to all of the cups in a single row extend lengthwise of the machine through the slots in the cups of the rows. In this manner, each peel or skin-ejecting rod 46 when actuated or forced outwardly through the slots 45 will simultaneously eject all of the peels or skins in the cups of its row as depicted in Fig. 10. As a means for forcing the rods 46 outwardly when the cups reach the peel-ejecting stations illustrated in Fig. 10, cams 47 are mounted on the ends of the frame so as to be engageable by the ends of the rods 46 as the shafts 13 and 14 rotate. These cams, when engaged by the ends of the rods, force the rods outwardly in the slots 45 and thus expel the reamed peels or skins P from the cups.

As a means for loading the cups, chutes 48 are arranged over the top of the machine terminating in outlets 49 above and between the shafts 13 and 14. These outlets are controlled by means of a hinged gate 50 that is spring-urged by springs 51 into an uppermost position preventing egress of the fruit F from the chutes. At the ends of the gate 50 there are arms 52, the ends of which are arranged in the path of movement of the ends of the rods 46 so that as the shaft 14, shown in Fig. 8, rotates from the position shown, the end of the rod 46 will engage the arm to swing the arm rearwardly or into the dotted line position shown in Fig. 10 wherein the foremost fruit in each chute is released therefrom so that it may drop through the outlet 49 toward a position between the two shafts 13 and 14. As soon as the end of the rod 46 depresses the arm 52 sufficiently to clear it the springs 51 are effective to immediately return the gate 50 to closed position retaining the succeeding fruit in the chutes 48 therein until the arm 52 is engaged by a succeeding rod 46. The engagement between the rod 46 and the arm 52 takes place slightly in advance of the cups 21b arriving at the loading position shown in Fig. 11. That is, the engagement between the rod 46 and the arms 52 occurs while the shaft 14 is rotating between stations. Consequently, a fruit F from each chute will be released and start to drop while the cups 21b are rotating from the position shown in Fig. 10 to the position shown in Fig. 11. When the released fruit reaches the position of the cups 21b, these cups will be sufficiently close together to catch and to hold the dropped fruit.

Figures 6, 7:
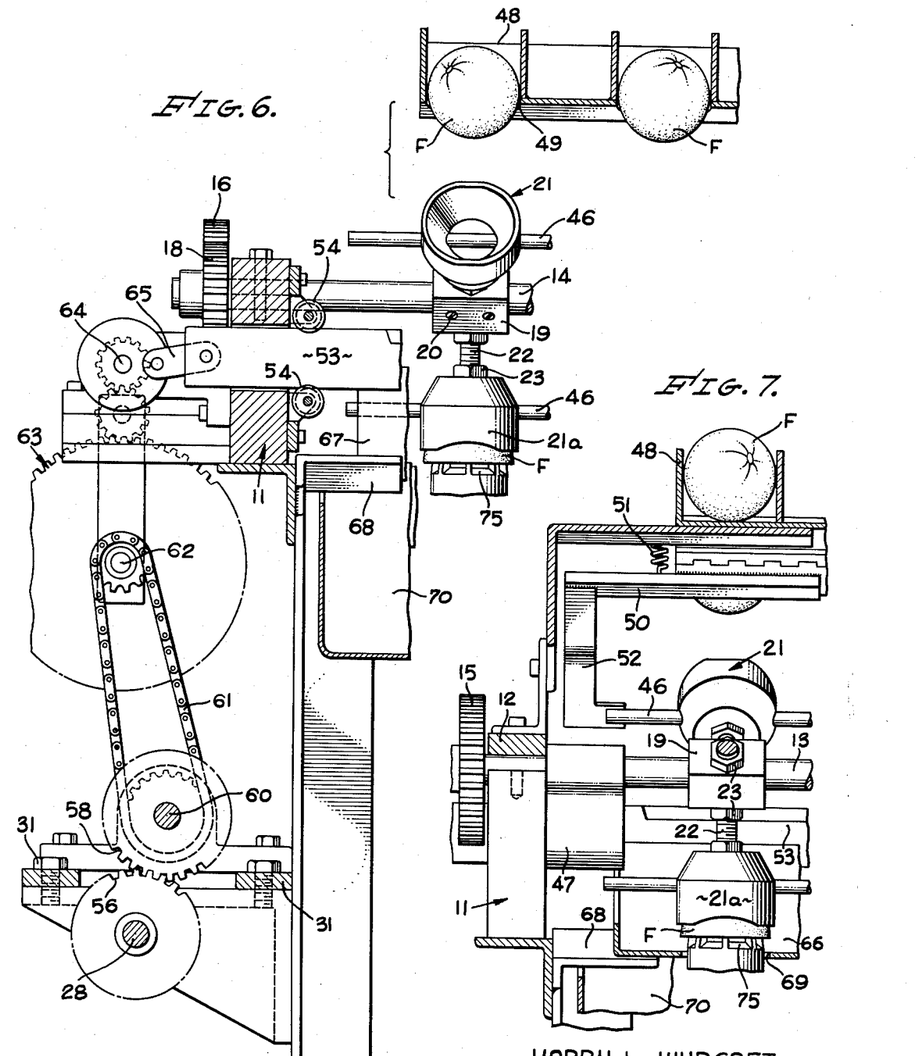
Fig. 6 is an enlarged partial view in vertical section taken substantially upon the line 6—6 upon Fig. 2 in the direction indicated.
Fig. 7 is an enlarged partial view in vertical section taken substantially upon the line 7—7 upon Fig. 2 in the direction indicated.
Figure 11:
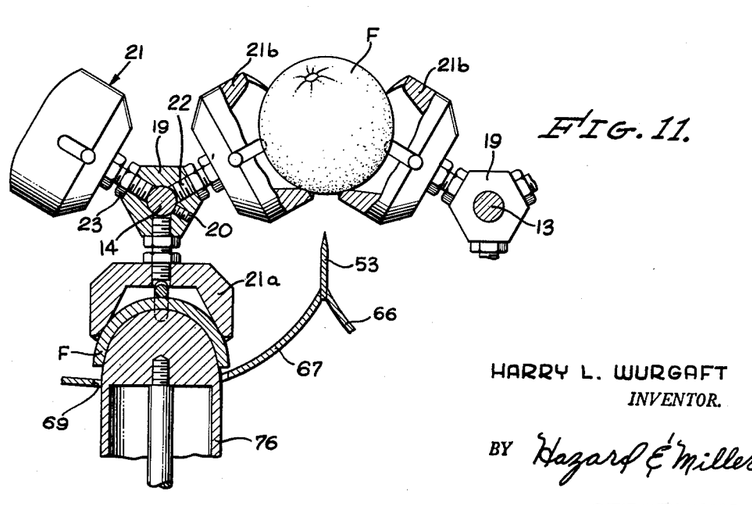
Fig. 11 is a partial view in vertical section of a portion of Fig. 5 and illustrating the manner in which the cups receive the fruit that is to be reamed for its juice.

In such a position as depicted in Fig. 11 the fruit F is disposed immediately above a longitudinally extending knife blade 53, the ends of which extend through the bearing blocks 11. The knife blade is preferably supported for longitudinal reciprocation by means of rollers 54, see Fig. 6.

On the transverse shaft 28 there are gears 55 and 56 which mesh with gears 57 and 58, respectively on stub shafts 59 and 60 that are rotatably supported on bearings mounted on the upper side of the shelf or table 30. The stub shaft 60 has a sprocket thereon over which an endless chain 61 is trained. This chain, in turn, drives a countershaft 62 which is gearedly connected such as by gears 63 to a shaft 64 rotatably mounted adjacent the top of one end of the frame. This shaft 64 is consequently driven at constant speed at a relatively high speed of rotation from the motor 24 and has a link 65 connecting an offset pin thereon with the knife blade 53. In this manner, the knife blade 53 is rather rapidly reciprocated longitudinally so that when the fruit F is ultimately shifted downwardly by the cups from the position shown in Fig. 11, the knife blade will cut it in half with a slicing action. During the descent of the fruit against the knife blade the cups 21b mutually approach each other and press gently against the sides of the fruit so that normally the halves of the fruit are frictionally retained within their respective cups. However, if the halves are not frictionally retained in their cups they are retained therein by sheet metal shelves 66 and 67. These shelves extend lengthwise of the frame and are supported at its sides as illustrated in Fig. 10 and at the ends of the frame by supporting brackets 68. Their edges merely lie against the sides of the reciprocating knife blade. These shelves are slightly spaced from but are close to the cups on the two shafts 13 and 14 so that even if the halves, after being severed from the whole fruit, are not frictionally retained within the cups the curved shelves will keep the halves from dropping therefrom as the halves are carried over apertures 69 in the shelves.

Figure 1:
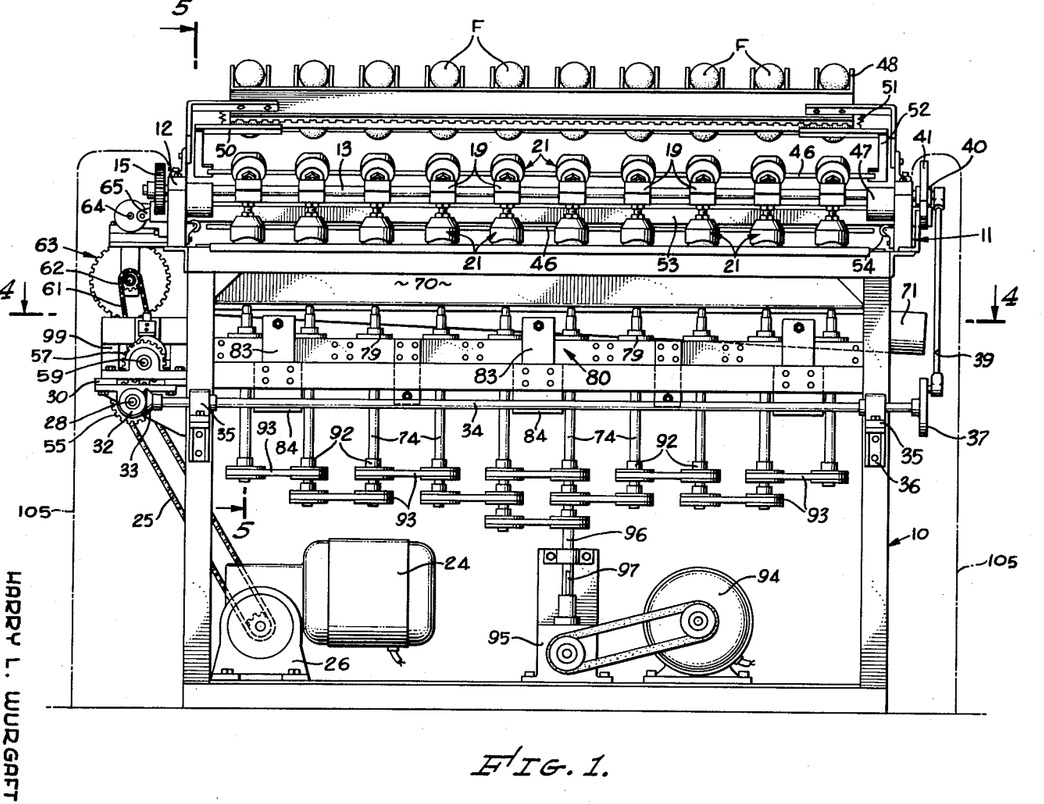
Figure 1 is a view in side elevation of the working parts of the machine, the covers being shown as having been removed and illustrated therein by phantom lines.
Figure 2:
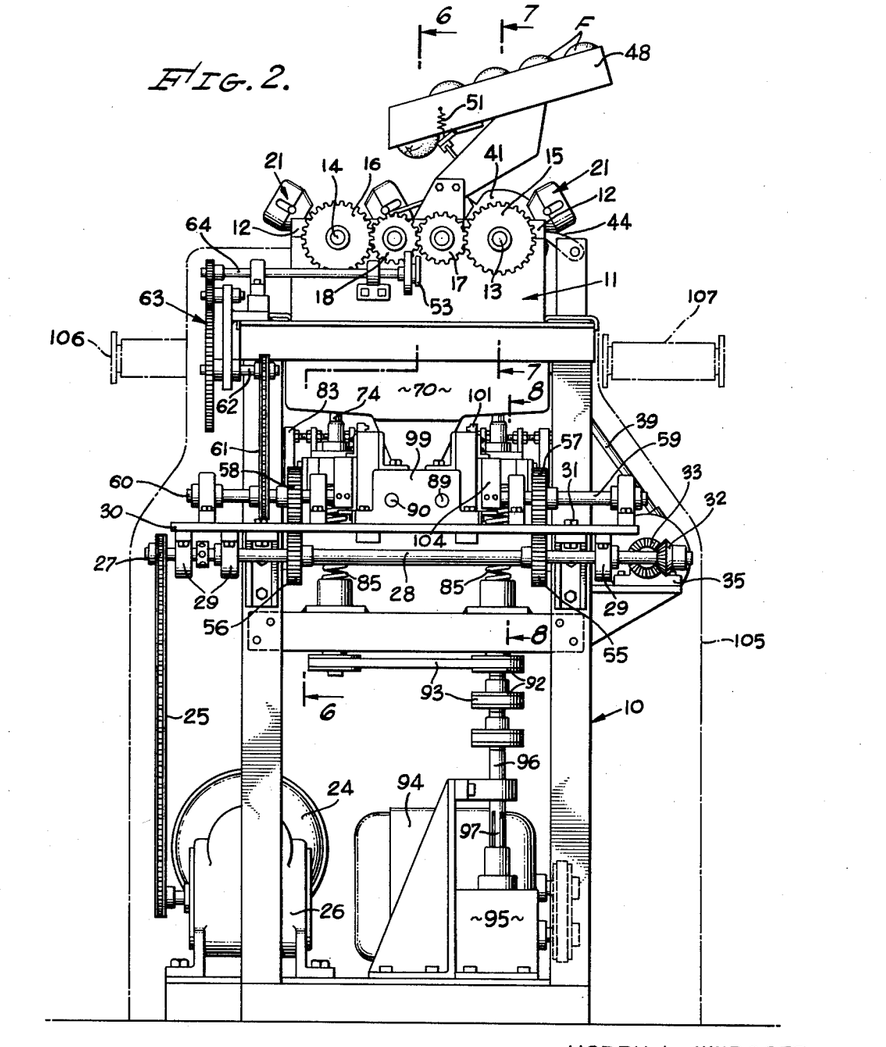
Fig. 2 is a view in end elevation of the machine, the covers being illustrated as having been removed and shown in merely phantom lines along with conveyors that are preferably employed in conjunction with the machine.
Figure 3:
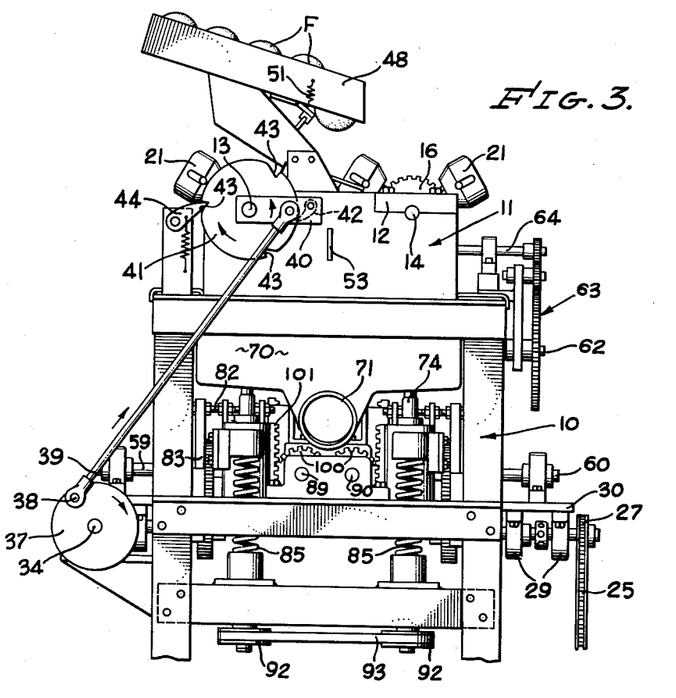
Fig. 3 is a partial view in end elevation of the machine taken from the opposite end of the machine from that illustrated in Fig. 2.
Figure 5:
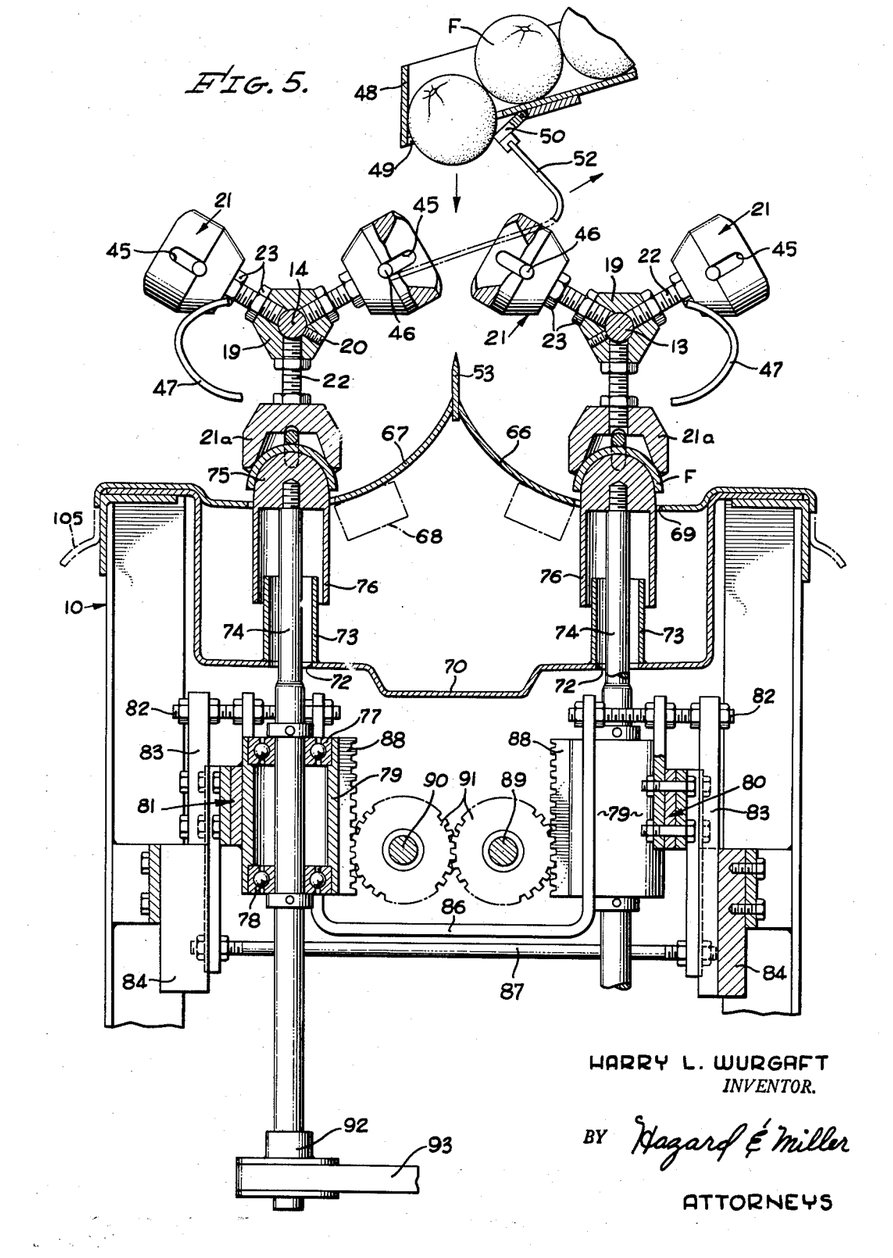
Fig. 5 is an enlarged sectional view taken substantially upon the line 5—5 upon Fig. 1 in the direction indicated.

Beneath the shelves there is disposed a trough or juice-collecting pan 70 supported at its sides by the frame and having an inclined bottom which causes the juice collected thereon to descend by gravity towards an outlet opening 71, see Fig. 3. This pan has apertures 72 formed therein, there being one aperture 72 beneath each aperture 69 in the shelves. The apertures 72 are surrounded by upstanding tubes 73 through which reamer spindles 74 extend. The reamer spindles carry reamers 75 at their upper ends which reamers have downwardly extending skirts 76 which telescope over the tubes 73. The reamers are elevated by their spindles up through the apertures 69 to engage the fruit halves in the tubes 21a at the reaming station. Subsequently, they are dropped or lowered from reaming position to the position shown in Fig. 10. The lengths of the skirts 76 with relation to the lengths of the tubes 73 is such that in the uppermost positions of the reamers there is still some overlap of the skirts with respect to the tubes, as shown in Fig. 5, so that juice extracted from the fruit halves and which descends through the apertures 69 into the collecting pan 70 is effectively confined therein.

There are two rows of reamer spindles 74, one row being disposed beneath the shaft 13 and the other row being disposed beneath the shaft 14. Each reamer spindle extends through two anti-friction bearings, the upper bearing of which is indicated at 77 and the lower bearing of which is indicated at 78. These bearings are mounted in sleeves or tubes 79 which, in turn, are mounted on longitudinally extending carriers 80 and 81, respectively.

Figure 4:
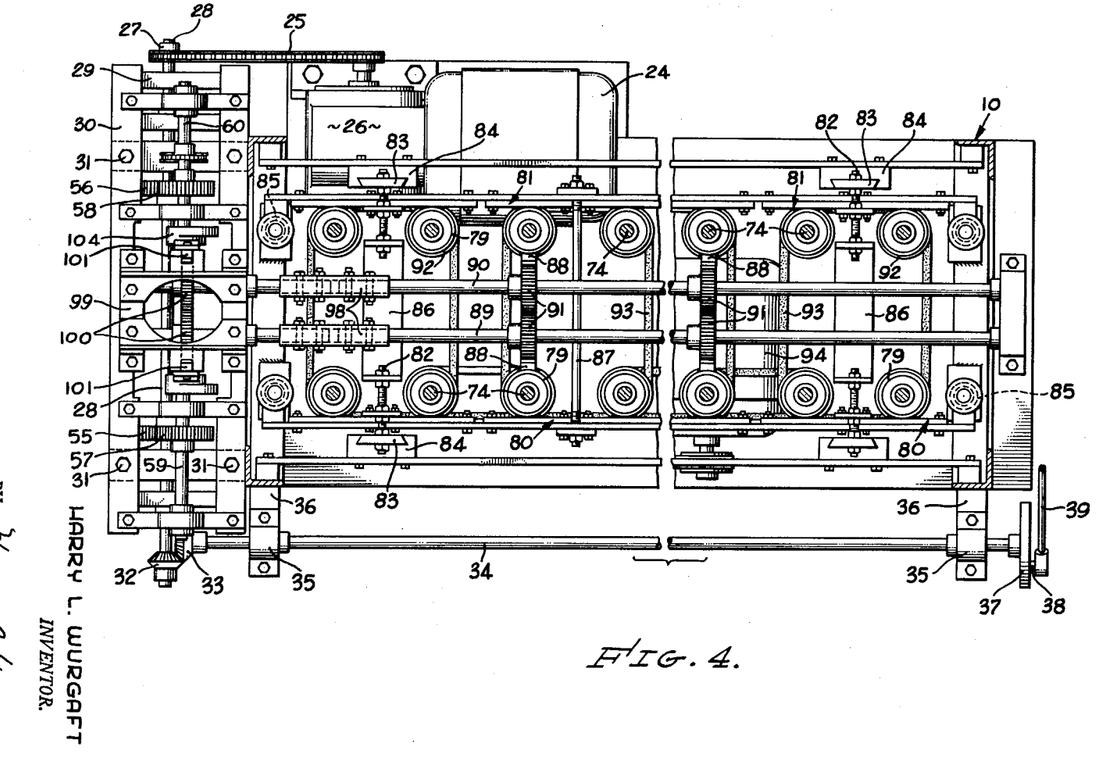
Fig. 4 is a horizontal section taken substantially upon the line 4—4 upon Fig. 1 in the direction indicated.

The carriers are mounted for transverse adjustment by means of studs 82 on slides 83 that are vertically reciprocable in dovetailed guides 84, see Fig. 4, mounted on the frame. The ends of the carriers are resiliently supported on compression springs 85. The two carriers are rigidly connected together by means of brackets 86 which may be mounted upon the studs 82, and if desired, an additional tie rod 87 may connect the two carriers. On two of the tubes or sleeves mounted on each carrier there are racks 88. Two longitudinally extending shafts 89 and 90 are rotatably mounted upon the frame and carry gears 91 which mesh with each other and with the racks 88. The shafts 89 and 90 are rotatably oscillated so that when these shafts rotate in one direction the geared connection with the racks 88 will cause the carriers to be lifted to lift the reamer spindles from the position shown in Fig. 10 to the position shown in Fig. 5. Conversely, when the shafts are rotated in the opposite direction the carriers will be lowered from the position shown in Fig. 5 to the position shown in Fig. 10.

As a means for rotating the spindles the spindles are equipped at their lower ends with pulleys 92 and endless belts 93 are trained thereover. These belts are so arranged that each belt encircles the pulleys on four spindles. Some belts encircle pulleys on spindles of two adjacent groups of four spindles each. All spindles are driven by a second electric motor 94 mounted on the base of the frame and through a gear box 95. The spindle 96 has a splined connection, indicated at 97, with the gear box so as to maintain a driving connection between the motor and that spindle even though the spindle is raised and lowered. In this manner, all of the spindles will be constantly rotated regardless of whether they are raised or lowered by their respective carriers.

The shafts 89 and 90 are equipped with flexible couplings 98 and extend beyond the end of the frame over the table or shelf 30 and into a bearing block 99 thereon. These shafts are equipped with meshing gears 100 which mesh with each other and with racks 101 that are slidably mounted in guides on the shelf or table. Each rock has an upper and lower cam follower, indicated at 102 and 103, respectively, that are disposed above and below a cam 104. These cams are mounted on the inner ends of the stub shafts 59 and 60, respectively. As previously explained, the shaft 28 is constantly rotated and drives the stub shafts 59 and 60 through the gears 57 and 58, respectively. Rotation of the cams produces a forcible lifting of the racks 101. When these racks are lifted the gears 100 will impart to the shafts 89 and 90 a partial rotation in one direction which is effective to lift the carriers and consequently the reamer spindles. Continued rotation of the cams 104 depresses the racks 101 and produces a reverse partial revolution of the shafts 89 and 90, and consequently a depressing of the carriers and of the reamer spindles. The mechanism is so arranged that a raising of the reamer spindles occurs during the time interval that one of the cups assumes its lowermost position, shown at 21a on Fig. 11, and after completing the reaming of the fruit half the reamer descends while the cup remains in this position and remains in its lowered position until a succeeding cup positions a fruit half in the reaming station.

In a machine of this character such wear or damage as may occur is usually in the operating parts that are effective to raise and lower the reamer spindles. Most of such parts are located or are mounted on the shelf 30. Should any of these parts become damaged or worn so as to require replacement, it is merely necessary to detach the shelf by means of its attaching bolts 31, disconnect the chains 25 and 61 and the shelf and all of its associated structure can be bodily removed from the machine. A standby shelf may be applied to the frame and attached thereto by the bolts 31 so that in the event of breakdown a minimum time loss will ensue. It is possible that the gears 91 may become worn. These gears are mounted on the shafts 89 and 90 by means of set screws and should they become worn, it is merely necessary to loosen the set screws, slide the gears longitudinally on the shafts 89 and 90, partially rotate them and then return them to meshing engagement with their racks 88. Usually, the racks 88 are capable of withstanding any ordinary wear or abuse. Other working parts of the machine are located externally of the frame and are readily accessible.

It will be appreciated that the machine in operation rotates the shafts 13 and 14 with a step-by-step motion synchronously and in opposite directions that as opposed cups 21 thereon approach each other fruit from the chutes is released in timed relation thereto so as to drop between the opposing cups. These cups are then caused to carry the fruit against the reciprocating knife blade 53 so as to halve the fruit. The fruit halves are then carried by their respective cups to the reaming position and during the period of dwell at this position, the reamers which are constantly rotated, are elevated into the fruit halves to ream them and then are caused to descend. Following descent of the reamers, the cups carry the peels through the peel-ejecting position wherein the rods 46 which are common to all of the cups that are in a row on a shaft, simultaneously eject the peels from the cups of this row. The cups pass from such ejecting position to the locating position and the cycle is repeated.

Preferably, the major portion of the machine is enclosed within removable sheet metal covers 105 and conveyors 106 and 107 may extend along sides of the machine to receive the peels that are ejected from the cups. When it is necessary to clean the machine the shelves 66 and 67 may be merely lifted from the frame and from their supporting brackets 68, thus exposing the pan 70 which can be readily cleaned.

From the above-described construction it will be appreciated that an improved citrus juice extractor is provided which is of relatively simple construction and which is of highly durable design. Working parts of the machine are so arranged that they may be readily removed from the machine as a complete unit, enabling standby units to be kept and substituted therefor whenever occasion requires. Whenever a different-sized fruit is used with the machine, instead of replacing the individual cups 21, the bearings caps 12 may be removed from the bearing blocks and the shafts 13 and 14, together with the cups thereon, may be bodily removed and replaced with corresponding shafts having larger or smaller sized cups thereon.

Various changes may be made in the details of construction without departing from the spirit and scope of the invention as defined by the appended claims.

I claim:

1. A citrus juice extractor comprising a frame, a pair of interconnected parallel shafts rotatably supported on said frame, a plurality of groups of radially arranged cups on the shafts for receiving fruit, certain of said cups of each group lie in the same plane as the cups of the adjacent groups, said cups each having a pair of parallel opposed slots in the sides thereof, a ratchet disc connected to one end of one of said shafts, a prime mover mounted on the frame and interconnected to the ratchet disc for causing the latter to rotate with a step-by-step motion, a fruit hopper supported by the frame for depositing fruit between opposed cups on the shafts as they approach each other during rotation of the shafts, a knife blade supported by the frame beneath the shafts against which the fruit is carried by the cups to be divided thereby, rotary reamers mounted on the frame and disposed beneath the shafts, a second prime mover mounted on the frame and interconnected to said reamers for rotating the same, structure interconnected to said first-mentioned prime mover and reamers for raising and lowering said reamers while the cups on the shafts are stationary in their lowermost positions, a peel ejector rod common to all the cups of each group being in the same plane, said rod extending through the slots in the sides of said cups, and a rod actuating cam mounted on the frame for forcing the rods outwardly through their slots during rotation of the shafts to eject peels from the cups after they have been reamed by the reamers.

2. A citrus juice extractor comprising a frame, a pair of interconnected parallel shafts rotatably mounted upon the frame, a ratchet disc on one end of one of said shafts, a prime mover mounted on the frame and interconnected to said ratchet disc for rotating the latter in a step-by-step motion and the shafts synchronously, fruit-receiving cups mounted in radial rows on the shafts, said cups having a pair of opposed parallel slots in the sides thereof, an ejector rod common to all the cups of each row, said rod extending through the slots in the sides of said cups, a rod actuating cam mounted on the frame for forcing the rods outwardly through their slots during rotation of the shafts to eject peels from the cups after the fruit has been reamed, chutes supported by the frame and leading to a point above opposed cups on the shafts, a gate on the chutes for releasing fruit therefrom to fall between opposed cups as they approach each other, said gate having an extension thereon, said extension being struck by the ejector rods to actuate said gate as their cups approach loading positions to open the gate and release the fruit to the cups, a knife blade supported by the frame beneath the shafts against which the fruit is carried by the cups to be divided thereby, and reamers rotatably mounted on the frame for reaming the fruit halves in the cups during a period of dwell of the shafts.

References Cited in the file of this patent
UNITED STATES PATENTS

| | | |
|---|---|---|
| 1,620,551 | Hughes | Mar. 8, 1927 |
| 1,879,795 | Minsky et al. | Sept. 20, 1932 |
| 1,888,528 | Faulds | Nov. 22, 1932 |
| 1,888,529 | Faulds | Nov. 22, 1932 |
| 1,922,818 | Nordstrom | Aug. 15, 1933 |
| 2,114,218 | Edenfield | Apr. 12, 1938 |
| 2,354,721 | Walker et al. | Aug. 1, 1944 |
| 2,515,749 | Wallace et al. | July 18, 1950 |